3,325,293
PROCESS FOR PRODUCING A CONFECTIONARY CREAM CANDY-CENTER AND THE RESULTING PRODUCT
Edward G. Meyer, 2743 W. Bryn Mawr, Chicago, Ill. 60645
No Drawing. Filed Apr. 8, 1964, Ser. No. 358,410
13 Claims. (Cl. 99—134)

This invention generally relates to a confectionary and more particularly relates to a dietetic confectionary cream and process for making the same.

In manufacturing cream center candies it is desirable to first manufacture the cream center in long cylindrical pieces which can be stored for indefinite periods of time prior to being sliced into predetermined cream center lengths and coated with chocolate and the like to form the candies. However, a problem has existed in that dietetic (sugarless) candy creams normally had a short shelf life and could not be stored for long periods of time prior to their use. This problem is especially acute in dietetic creams which do not have any sugar therein to protect the creams and prevent moisture evaporation therefrom.

The present invention substantially eliminates these problems and provides a process of manufacturing a dietetic cream and a dietetic cream which has a shelf life many times that of prior dietetic creams.

Therefore, it is an object of the present invention to provide a dietetic confectionary cream having a long shelf life.

Still another object of the present invention is to provide a process of manufacturing a dietetic confectionary cream having a prolonged shelf life.

Still another object of the present invention is to provide a dietetic confectionary cream prepared from a sorbitol solution and from mono- and diglyceride emulsifiers.

Yet still another object of the present invention is to provide a process of manufacturing a dietetic confectionary cream by first forming a gel base between a sorbitol solution and a emulsifier selected from the class consisting of mono- and diglycerides of fat forming fatty acids and then blending in the gel the remainder of the dietetic confectionary cream ingredients.

It is still another object of the present invention to provide a dietetic confectionary cream utilizing a sorbitol solution and a mono- and diglyceride emulsifier along with confectionary vegetable fats or margarines.

It is still another object of the present invention to provide a dietetic confectionary cream utilizing a sorbitol solution and an emulsifier selected from the class of mono- and diglycerides with the ratio of the sorbitol solution to the emulsifier being between 36:1 and 36:5.

It is another object of the present invention to provide a process for forming a dietetic confectionary cream by adding to an edible glyceride emulsifier a sorbitol solution, then adding a vegetable fat or oil and then adding the remainder of the dietetic confectionary cream ingredients to the gel while agitating said gel.

Other objects, features and advantages of the present invention will become apparent after a careful consideration of the following detailed description taken in conjunction with examples of the present invention.

In manufacturing dietetic confectionary creams it is important that the creams have a pleasant taste. That is, that the creams do not leave the palate with a greasy feeling nor coat the palate such that the sense of taste becomes ineffective. The creams utilized for cream-centered chocolates require a certain amount of firmness so that they may be shaped by a mechanical rod roll forming machine and hold their cylindrical shape as well as their texture over a prolonged storage period. The cylindrical dietetic confectionary candy creams may be sold as such to candy manufacturers and sliced into predetermined pieces at the candy plant where the pieces are coated with hot chocolate and the like.

The dietetic confectionary creams of the present invention are manufactured by slowly adding Sorbo (a 70 percent sorbitol solution) to Arlacel 186 or Atmos 300 (an emulsifier selected from the class consisting of mono- and diglyceride of edible fat forming fatty acids) with continuous agitation. The mixture is allowed to form a heavy gel-base before or after adding a mixture of edible vegetable fats. The temperature of the vegetable fats is such that they will readily blend with and be taken up by the gel-base and will not break up the gel-base. After adding the vegetable fats, powdered milk, gum, sweetener and flavoring are added and all the ingredients are whipped into a confectionary cream.

The proportions of the various ingredients utilized are predetermined such that the confectionary cream will have both a good consistency and a good taste. That is, when too much emulsifier is used, the palate becomes coated upon eating the confectionary cream to destroy or impair the sense of taste; when there is too much fat, the confectionary cream leaves a greasy after-taste; when the temperature of the mixture is too high or too low, the cream will not have the proper consistency; and when the ingredients are not blended properly the cream will not have the proper consistency. Also, it is important in the process of the present invention that the proper gel-base be formed in order to encapsulate the moisture content of the cream and substantially prevent evaporation of said moisture as well as substantially preventing oxidation during the storage of the confectionary creams.

A solution of water and sorbitol hereinafter referred to as the sorbitol solution is slowly added to the emulsifier with continuous mechanical agitation. The sorbitol solution is added approximately one part at-a-time. The ratio of sorbitol solution to emulsifier is between approximately 36:1 and 36:5. To this agitating mixture which was preferably formed a heavy gel-base is slowly added melted edible vegetable fats which have a low melting temperature. The temperature of the liquid vegetable fat is preferably below 130° F. in order to prevent the breakdown of the heavy gel-base formed by the sorbitol and the glyceride emulsifier. The addition of the fat is further controlled such that it instantly is blended with the gel-base with little or no excess being added, as would occur if the fat were dumped into the gel-base. If the gel-base is allowed to break down, the water which is encapsulated by the gel-base is released and subjected to future evaporation. (However, formation of the gel-base after the addition of the vegetable fat is also permissible and this also allows the gel-base to encapsulate or protectively hold the water and substantially prevent evaporation thereof.) Additional cream forming vegetable shortenings such as "Betrkake" or "Konut" are added with or after the vegetable fats to allow the final blend to be whipped into a suitable confectionary cream. For example, when vegetable fat having a temperature of 130° F. or higher is added to an agitating heavy gel-base, the gel-base is broken down and the final confectionary cream formed has a poor consistency as well as poor water retaining properties.

The temperature of the ingredients other than the fats, for a confectionary candy cream are preferably at room temperature when the heavy gel-base was formed approximately between 65° and 75° F. with the preferable average being approximately 70° F. When the sorbitol solution and the glyceride emulsifier are at a high temperature, such that after mixing they form a solution, the temperature thereof is reduced to room temperature where the heavy gel-base forms. The temperature is lowered before or after the vegetable fat and shortening are added to the sorbitol solution and the glyceride emulsifier mixture. However, when the temperatures of the sorbitol solution and the glyceride emulsifier are too low, a stiff gel-base is formed that causes a lumpy unusuable confectionary candy cream having overall poor quality.

Powdered milk is added to the agitating fat and gel-base mixture as well as flavoring, gum, and calcium carbonate. The resulting mixture is blended and whipped into a confectionary cream and then is removed from the agitator, mechanically formed into rods, candy cream-center pieces or any desired shape and stored at room temperature, if desired, for future use as candy cream-centers, cookie and cake filling.

In the process for manufacturing dietetic confectionary candy cream-centers the powdered milk is added after the fat in order to provide a cream which is stiff enough to be mechanically formed into cream rods or candy cream-centers that maintain their shape.

My invention is illustrated further by the following examples in which all the ingredients are referred to in parts by weight unless indicated otherwise.

*Example I*

Four parts of a liquid glyceride emulsifier selected from the class consisting of mono and diglycerides of edible fat forming fatty acids, such as Arlacel 186 and Atmos 300, were placed in a vat having a mechanical agitator running at low blending speeds. 36 parts of a sorbitol solution, such as Sorbo, at room temperature were slowly added and blended with the glyceride emulsifier and allowed to form a heavy gel-base.

16 parts of melted vegetable fat, such as Paramount B (a margarine made from hydrogenated vegetable oils), having a temperature below 130° F. and preferably between 110–120° F. were slowly added to the heavy gel-base. The fat was added such that it instantly blended with the gel-base to have very little excess at any particular addition time. After the addition of the vegetable fat, 5 parts of vegetable shortening such as "Betrkake" (an emulsified and plasticized hydrogenated vegetable shortening) and "Konut" (a coconut oil shortening) are slowly added. The shortening may be blended with the vegetable fats, and added therewith, if desired. The mixture continuously mechanically agitated and slowly added thereto are 16 parts of powdered milk, 3½ parts of calcium carbonate, 5 parts of an adhesive such as gum arabic, 1 part of a jelly such as glycerine, 2¼ parts of sugarless sweetener (2 parts mannitol and ¼ part Sucaryl, a cyclamate sweetener) were added, and a suitable amount of flavoring (vanilla, lemon, orange, peppermint, strawberry, rum, coconut and any desired flavor).

The slow addition of the above ingredients is such that they are preferably instantly blended with the ingredients in the vat. After all the ingredients are blended they are whipped into a suitable confectionary cream and then removed from the vat and placed through a cylindrical extruder where it is extruded into rod form and then cut at predetermined lengths. The cream was sufficiently firm to hold its cylindrical shape yet soft and moist, it had a long shelf life of over one month without losing its moist consistency, and it had a good taste. The dietetic confectionary cream was suitable for candy cream centers. The dietetic candy cream was tested to indicate whether or not it would become rancid on standing. It was determined that after 800 days the cream produced no signs of turning rancid. This was determined by submitting the cream to an A.O.M. heat test for 50 hours at 98° F. which is equivalent to 800 days of standing. The tested cream was submitted to a hydrogen peroxide test after the 50 hours and zero percent hydrogen peroxide was detected.

*Example II*

The same procedure of Example I was followed except 5 parts of Atmos 300 or Arlacel 186 emulsifier were used to form the original gel-base. The cream that resulted had the same properties as the confectionary cream of Example I except it had a poorer taste quality—it left a fatty aftertaste.

In the following examples the same procedures and conditions were followed as that of Example I with the proportions of the ingredients being the same except for the amount of the glyceride emulsifier, Atmos 300 or Arlacel 186.

*Example III*

Three parts of the glyceride emulsifier were placed in the vat. The resulting dietetic confectionary cream had the same properties as the cream of Example I with a slightly improved taste.

*Example IV*

2½ parts of glyceride emulsifier were placed in the vat. The formation of the heavy gel-base was slower than the gel-base formation of Example I but the resulting dietetic confectionary cream had the same physical properties with an improved taste over the cream of Example I.

*Example V*

2 parts of the glyceride emulsifier were placed in the vat. The gel-base formations were slow and light and did not form into a heavy gel-base until after the vegetable fats were added and blended. The resulting dietetic confectionary cream has the properties of the cream of Example I with a superior taste.

*Example VI*

1 part of glyceride emulsifier was placed in the vat. A gel-base did not form until after the vegetable fat was added and blended therewith. The resulting confectionary cream had a good taste, but was too soft to be used as a candy cream-center. It was a proper filling for cookies, and cakes, etc.

*Example VII*

½ part of the glyceride emulsifier was placed in the vat. The proper heavy gel-base did not form and did not form even after the vegetable fat was added. The resulting mixture was lumpy and unsuitable for use as a confectionary cream.

*Example VIII*

The edible fat content of the confectionary cream formed by the process of Example I was varied by increasing the amount of the vegetable shortening, the "Betrkake" or "Konut" to 9 parts per 16 parts of the vegetable fats. The confectionary cream produced was usable as a candy cream-center and had the equivalent qualities of the cream produced in Example I.

*Example IX*

The fat content of the confectionary cream was changed by using less vegetable fats than were used in Example I, to 11 parts of vegetable fats per 5 parts of vegetable shortening. The confectionary cream produced, in accordance with the procedures of Example I, had equivalent properties to the confectionary cream of Example I.

The following table illustrates the results of some of the above examples in terms of percent by weight of the various ingredients utilized to make a confectionary cream-base which is hereinafter used to describe that portion of the confectionary cream excluding the flavoring and sweetener.

TABLE I

| Example | Percent Atmos 300 or Arlacel 186 | Percent Sorbo | Percent Vegetable Fat | Percent Vegetable Shortening | Percent Milk | Percent CaCO₃ | Percent Gum |
|---|---|---|---|---|---|---|---|
| I | 4.7 | 42.1 | 18.7 | 5.8 | 18.7 | 4.2 | 5.8 |
| II | 5.8 | 41.6 | 18.5 | 5.8 | 18.5 | 4.0 | 5.8 |
| III | 3.5 | 42.6 | 18.9 | 5.9 | 18.9 | 4.3 | 5.9 |
| IV | 3.0 | 42.8 | 19.1 | 5.9 | 19.1 | 4.2 | 5.9 |
| V | 2.4 | 43.2 | 19.2 | 6.0 | 19.2 | 4.0 | 6.0 |
| VI | 1.2 | 43.7 | 19.4 | 6.1 | 19.4 | 4.1 | 6.1 |
| VII | 4.5 | 40.2 | 17.9 | 10.1 | 17.9 | 3.7 | 5.6 |
| VIII | 5.0 | 44.7 | 13.7 | 6.2 | 19.9 | 4.3 | 6.2 |

The amount of flavoring and sweetener added is dependent on what is desired for the flavoring of the resulting confectionary cream.

It is of course understood that the fat content of the creams made by Examples II–VI may also be varied in the same manner as Examples VIII and IX with the entire edible fat content therefore being between approximately 19–30% by weight of the confectionary cream-base with the ratio of the sorbitol solution to the edible glyceride emulsifier being between 36:5 and 36:1. The ratio of the vegetable fats to vegetable shortenings is predetermined such that the resulting mixture of edible fats has a melting point of less than 95° F. The edible vegetable fats used preferably have a melting point of less than 110° F. Generally this means a combination of about 5–9 parts of vegetable shortening per 16 parts by weight of vegetable fat. About 11–16 parts by weight of the fats are employed for 36 parts of the sorbitol solution.

The heavy gel-base composition of edible glyceride emulsifier and sorbitol solution comprises approximately between 42–51 percent by weight of the confectionary cream-base. The powdered milk normally comprises 16–20% by weight, the calcium carbonate about 3–5% by weight, and the gum about 5–7% by weight.

The following examples illustrate the effect of the ingredient temperature on the confectionary cream-base.

*Example X*

4 parts of Arlacel 186 or Atmos 300 were placed in a vat at slightly higher than room temperature, approximately 80° F. With continuous mechanical agitation 36 parts of Sorbo at room temperature were slowly blended with the emulsifier. The heavy gel-base did not form and vegetable fats were then added along with the remaining ingredients in accordance with the procedure of Example I. The resulting confectionary cream had good taste qualities but was too soft for use as a confectionary candy cream. It was applicable for cake toppings, cookie filling, etc.

*Example XI*

4 parts of Atmos 300 or Arlacel 186 were placed in a vat at approximately 100° F. and slowly added thereto were 36 parts of Sorbo at 100° F. The mixture of Sorbo and the emulsifier were allowed to stand and cool to room temperature whereupon a heavy gel-base was formed. To this the vegetable fats and remaining ingredients were added in accordance with Example I. The resulting confectionary cream had the qualities of the confectionary candy cream produced by Example I.

*Example XII*

4 parts of Atmos 300 or Arlacel 186 were placed in a vat and was at a temperature of approximately 55° F. To this, 36 parts of Sorbo at room temperature were slowly added. The Sorbo raised the overall gel-base temperature to room temperature and a heavy gel-base was formed. To this gel were added the vegetable fats and the remaining ingredients as described in Example I. The resulting confectionary cream had the properties of the confectionary candy cream of Example I.

*Example XIII*

4 parts of the glyceride emulsifier was placed in a vat and was below room temperature at approximately 55° F. To this was slowly added 36 parts of Sorbo which were below room temperature at approximately 60° F. The gel-base that formed was very stiff. After the vegetable fats and powders were added, in accordance with Example I, the mixture became hard and non-usable as a confectionary cream.

As noted by the above examples, it is preferable that the gel-base ingredients—the mixture of the sorbitol solution and the mono- and diglyceride emulsifier—are at room temperature, which is approximately between 65 and 75° F., and preferably is approximately 70° F. and also if these temperatures are too high, they will be allowed to cool to room temperature prior to adding any fats if a confectionary candy cream is desired.

The confectionary candy creams are mechanically shaped into rods by a pressure extruding machine and a cutting means that cuts the extruded cream at predetermined cream rod lengths. The cylindrical confectionary candy creams are further cut into cream candy centers before they are coated with hot chocolate. It is of course understood that various heat stabilizers may be added to the cream-base if desired. Suitable heat stabilizers that would preferably be added prior to the sorbitol solution would be Atmul 84 or Atmos 150 which are α monoglycerides of edible fat-forming fatty acids.

It is of course understood that the water content of the confectionary creams may be changed, as desired, by increasing or decreasing the water content of the sorbitol solution.

Other modifications and variations may be undertaken without departing from the concepts of the present invention and the above examples are intended as only exemplary thereof. It is understood that the scope of the present invention is to be limited only by the scope of the hereunto appended claims.

I claim as my invention:

1. A confectionary cream for use as a confectionary cream candy-center having a confectionary cream base comprising in approximate percentage by weight
   42–51% of a gel-base having 36 parts by weight of a sorbitol solution and 1–5 parts by weight of an edible glyceride emulsifier selected from the class consisting or mono- and diglycerides of edible fat forming fatty acids,
   19–30% edible fats with the fats being a mixture consisting of 16 parts by weight of a vegetable fat and 5–9 parts by weight of a vegetable shortening,
   16–20% of powdered milk,
   3–5% of calcium carbonate, and
   5–7% of a gum adhesive.

2. A confectionary cream for use as a confectionary cream candy-center having a confectionary cream base comprising in approximate percentages by weight
   42–51% of a gel-base having 36 parts by weight of a sorbitol solution and 1–5 parts by weight of an edible glyceride emulsifier selected from the class consisting or mono- and diglycerides of edible fat forming fatty acids,
19–30% edible fats with the fats being a mixture consisting of 16 parts by weight of a vegetable fat and 5–9 parts by weight of a vegetable shortening, powdered milk,
calcium carbonate, and
gum adhesive.

3. A confectionary cream for use as a confectionary cream candy-center having a confectionary cream base comprising in approximate percentages by weight
42–51% of a gel-base having 36 parts by weight of a sorbitol solution and 1–5 parts by weight of an edible glyceride emulsifier selected from the class consisting of mono- and diglycerides of edible fat forming fatty acids, and
19–30% edible fats with the fats being a mixture consisting of 16 parts by weight of a vegetable fat and 5–9 parts by weight of a vegetable shortening.

4. A confectionary cream for use as a confectionary cream candy-center having a confectionary cream base comprising in approximate percentages by weight
42–51% of a gel-base having 36 parts by weight of sorbitol solution and 1–5 parts by weight of an edible glyceride emulsifier selected from the class consisting of mono- and diglycerides of edible fat forming fatty acids, and
19–30% edible vegetable fats.

5. A confectionary cream for use as a confectionary cream candy-center having a confectionary cream base comprising in approximate percentages by weight
42–51% of a gel-base having 36 parts by weight of a sorbitol solution and 2–4 parts by weight of an edible glyceride emulsifier selected from the class consisting of mono- and diglycerides of edible fat forming fatty acids, and
19–30% of edible vegetable fats with the fats being a mixture consisting of 16 parts by weight of a vegetable fat and 5–9 parts by weight of a vegetable shortening.

6. A confectionary cream for use as a confectionary cream candy-center having a confectionary cream base comprising:
about 42–51% of a gel-base having 36 parts by weight of a sorbitol solution and 1–5 parts by weight of an edible glyceride emulsifier selected from the class consisting of mono- and diglycerides of edible fat forming fatty acids, and
edible fats with the fats being a mixture consisting of 16 parts by weight of a vegetable fat and 5–9 parts by weight of a vegetable shortening.

7. A confectionary cream for use as a confectionary cream candy-center having a confectionary cream base comprising:
42–51% of a gel-base formed from 36 parts by weight of a sorbitol solution and 1–5 parts by weight of an edible glyceride emulsifier selected from the class consisting of mono- and diglycerides of edible fat forming fatty acids, and
19–30% edible fats.

8. A process of forming a confectionary cream candy-center comprising:
slowly adding and substantially instantaneously blending 36 parts by weight of a sorbitol solution at room temperature with 1–5 parts by weight of an edible glyceride emulsifier at room temperature and being selected from the class consisting of mono- and diglycerides of edible fat forming fatty acids, for a period of time sufficient to form a heavy gel-base,
slowly adding and instantaneously blending 11–16 parts by weight of a melted vegetable fat at between 110–130° F. with said gel-base, slowly adding and blending with said vegetable fat and said gel-base 5–9 parts by weight of a vegetable shortening,
16 parts by weight of a gum adhesive,
5 parts by weight of a gum adhesive,
3½ parts by weight of calcium carbonate, sweeter, and flavoring, and
whipping the final mixture to form a confectionary cream.

9. A process of forming a confectionary cream candy-center comprising:
slowly adding and substantially instantaneously blending 36 parts by weight of a sorbitol solution at room temperature with 1–5 parts by weight of an edible glyceride emulsifier at room temperature and being selected from the class consisting of mono- and diglycerides of edible fat forming fatty acids, for a period of time sufficient to form a heavy gel-base,
slowly adding and instantaneously blending 11–16 parts by weight of a melted vegetable fat at between 110–130° F. with said gel-base, slowly adding and blending with said vegetable fat and said gel-base the remaining ingredients of the confectionary cream, and
whipping the final mixture to form a confectionary cream.

10. A process of forming a confectionary cream candy-center comprising:
slowly adding and substantially instantaneously blending 36 parts by weight of a sorbitol solution at room temperature with 2–4 parts by weight of an edible glyceride emulsifier at room temperature and being selected from the class consisting of mono- and diglycerides of edible fat forming fatty acids, for a period of time sufficient to form a heavy gel-base,
slowly adding and instantaneously blending 11–16 parts by weight of a melted vegetable fat at between 110–130° F. with said gel-base, slowly adding and blending with said vegetable fat and said gel-base the remaining ingredients of the confectionary cream, and
whipping the final mixture to form a confectionary cream.

11. A process of forming a confectionary cream candy-center comprising:
slowly adding and substantially instantaneously blending 36 parts by weight of a sorbitol solution with 2–4 parts by weight of an edible glyceride emulsifier being selected from the class consisting of mono- and diglycerides of edible fat forming fatty acids, for a period of time sufficient to form a heavy gel-base,
slowly adding and instantaneously blending 11–16 parts by weight of a melted vegetable fat with said gel-base,
slowly adding and blending with said vegetable fat and said gel-base 5–9 parts by weight of a vegetable shortening,
16 parts by weight of powdered milk,
5 parts by weight of a gum adhesive,
3½ parts by weight of calcium carbonate, sweetener, and flavoring, and
whipping the final mixture to form a confectionary cream.

12. A process of forming a confectionary cream candy-center comprising:
slowly adding and substantially instantaneously blending 36 parts by weight of a sorbitol solution with 2–4 parts by weight of an edible glyceride emulsifier being selected from the class consisting of mono- and diglycerides of edible fat forming fatty acids for a period of time sufficient to form a heavy gel-base,
slowly adding and instantaneously blending 11–16 parts by weight of a melted vegetable fat at between 110–130° F. with said gel-base,
slowly adding and blending with said vegetable fat and said gel-base 5–9 parts by weight of a vegetable shortening,
16 parts by weight of powdered milk, 5 parts by weight of a gum adhesive, 3½ parts by weight of calcium carbonate, sweetener, and flavoring, and whipping the final mixture to form a confectionary cream.

13. A process of forming a confectionary cream comprising:

slowly adding and substantially instantaneously blending 36 parts by weight of a sorbitol solution at room temperature with 1–5 parts by weight of an edible glyceride emulsifier at room temperature and being selected from the class consisting of mono- and diglycerides of edible fat forming fatty acids for a period of time sufficient to form a heavy gel-base, slowly adding and instantaneously blending 11–16 parts by weight of a melted vegetable fat at between 110–130° F., 5–9 parts by weight of a vegetable shortening, powdered milk and the remaining ingredients for the confectionary cream, and whipping the final mixture to form a confectionary cream.

References Cited

UNITED STATES PATENTS

| | | | |
|---|---|---|---|
| 1,983,568 | 12/1934 | Robinson et al. | 99—134 |
| 2,474,019 | 6/1949 | Steiner et al. | 99—139 |

A. LOUIS MONACELL, *Primary Examiner.*

RAYMOND N. JONES, *Examiner.*

S. E. HEYMAN, *Assistant Examiner.*